United States Patent [19]

Ohkawa et al.

[11] Patent Number: 4,854,555
[45] Date of Patent: Aug. 8, 1989

[54] DIAPHRAGM TYPE AIR SPRINGS

[75] Inventors: Fujio Ohkawa; Akira Higashidani; Hiroyuki Maeda, all of Yokohama, Japan

[73] Assignee: Bridgestone Corporation, Tokyo, Japan

[21] Appl. No.: 113,406

[22] Filed: Oct. 26, 1987

Related U.S. Application Data

[63] Continuation of Ser. No. 877,709, Jun. 23, 1986, abandoned, which is a continuation of Ser. No. 658,255, Oct. 19, 1984, abandoned.

[30] Foreign Application Priority Data

| Oct. 7, 1983 | [JP] | Japan | 58-186888 |
| Nov. 16, 1983 | [JP] | Japan | 58-214059 |
| Dec. 3, 1983 | [JP] | Japan | 58-227834 |
| Dec. 5, 1983 | [JP] | Japan | 58-228392 |

[51] Int. Cl.⁴ ............ B60G 11/26; F16F 9/04
[52] U.S. Cl. ............ 267/64.24; 267/64.21; 267/64.27; 267/122
[58] Field of Search ........... 267/64.19, 64.21, 64.23, 267/64.24, 64.25, 64.26, 64.27, 121, 122, 123, 140.1, 140.3; 188/278, 281, 319, 322.19, 322.21

[56] References Cited

U.S. PATENT DOCUMENTS

| 1,273,011 | 7/1918 | Snyder | 188/319 |
| 3,046,003 | 7/1962 | Schultz | 267/64.24 |
| 4,208,472 | 6/1980 | Cho et al. | 308/DIG. 8 X |
| 4,324,112 | 4/1982 | Fujiwara et al. | 138/44 X |
| 4,493,481 | 1/1985 | Merkle | 267/64.24 X |

FOREIGN PATENT DOCUMENTS

| 2759435 | 3/1982 | Fed. Rep. of Germany |
| 986327 | 3/1965 | United Kingdom | 267/64.24 |

Primary Examiner—Andres Kashnikow
Assistant Examiner—Matthew C. Graham
Attorney, Agent, or Firm—Sughrue, Mion, Zinn, Macpeak & Seas

[57] ABSTRACT

A diaphragm type air spring is disclosed, which comprises large and small piston members integrally connected to each other. Large and small outer shells are coaxially arranged with the piston members and integrally connected to each other with a common partition. Each of the large and small outer shells has a diameter larger than that of each of the respective large and small piston members. A diaphragm airtightly connects each of the large and small outer shells to each of the respective large and small piston members. An orifice is formed in the partition so as to communicate a small air chamber defined by the small piston member, small outer shell, diaphragm and partition with a large air chamber defined by the large piston member, large outer shell, diaphragm and partition, whereby a load of a vibration system is born with the large outer shell integrally connected thereto.

5 Claims, 10 Drawing Sheets

FIG_2
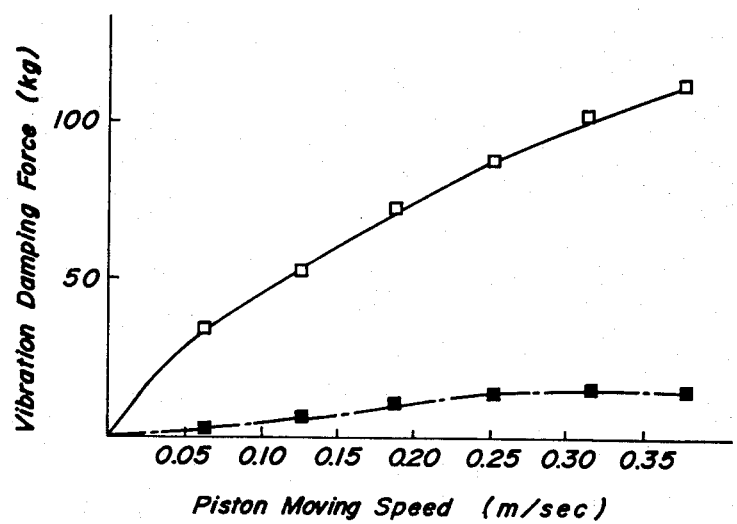
FIG_3
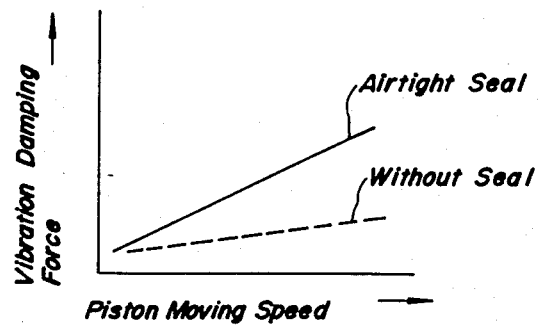

FIG_4
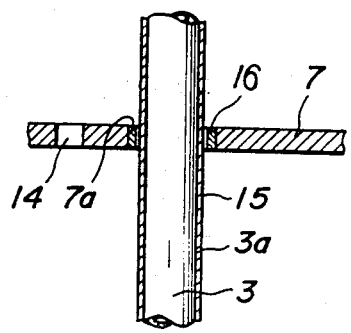
FIG_5
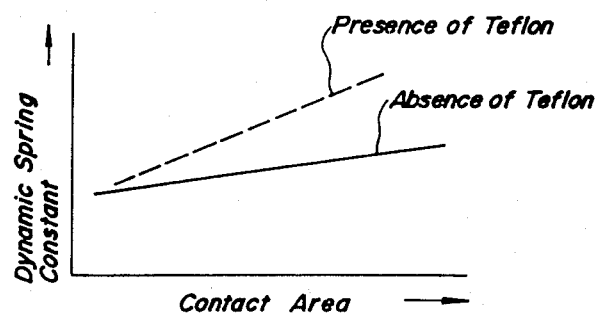

FIG_6
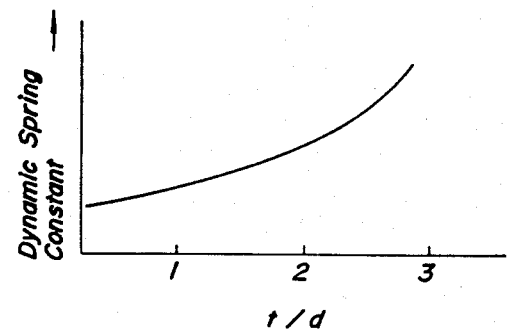
FIG_7
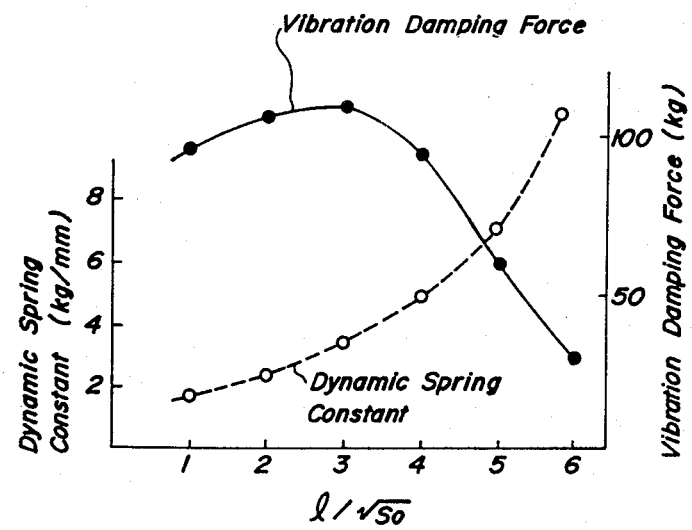

FIG_10
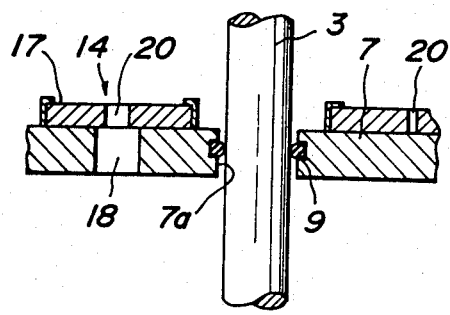
FIG_11
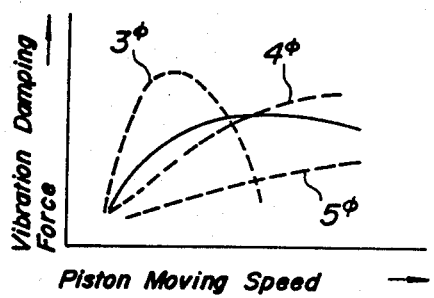
FIG_12
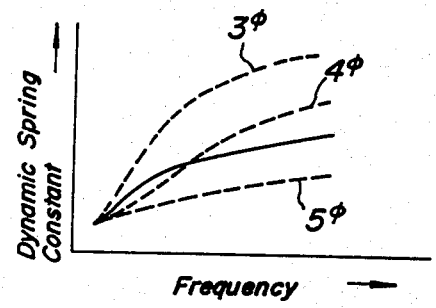

FIG_13a
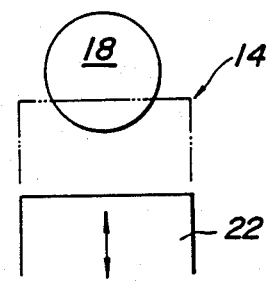
FIG_13b
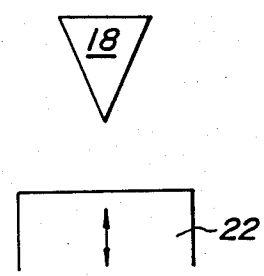
FIG_14
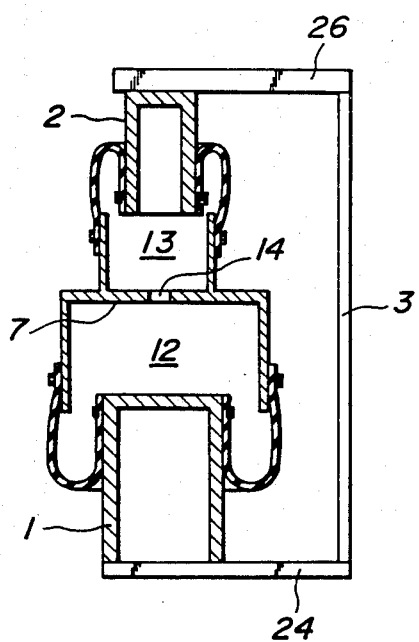

FIG_15
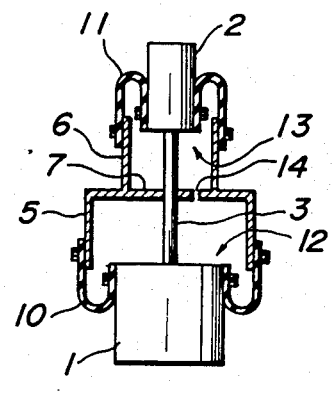
FIG_16
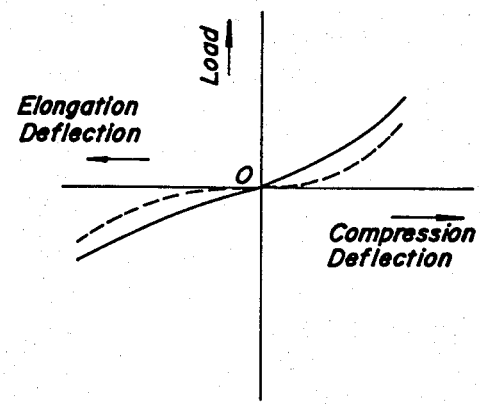

FIG_17
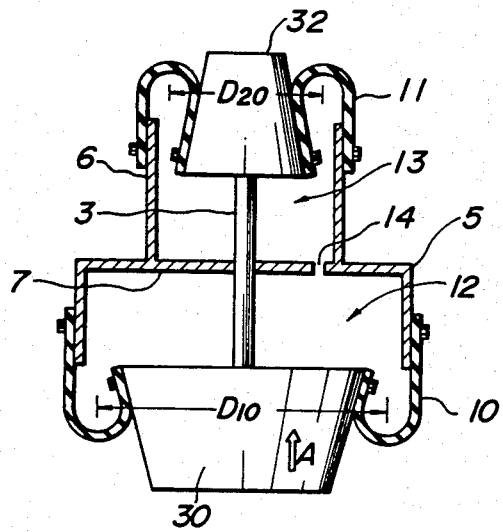
FIG_18a
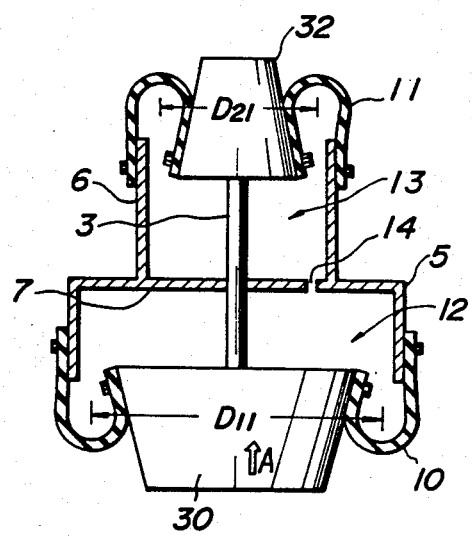
FIG_18b
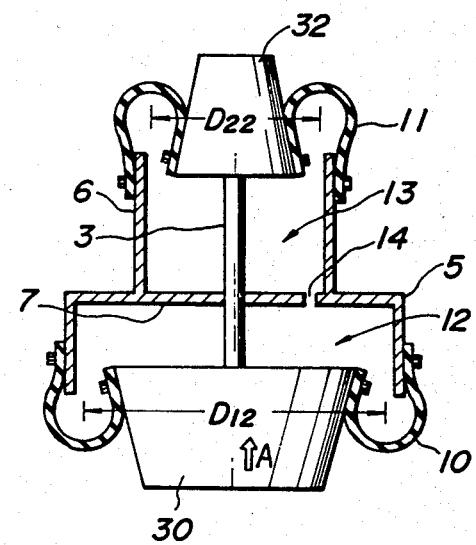

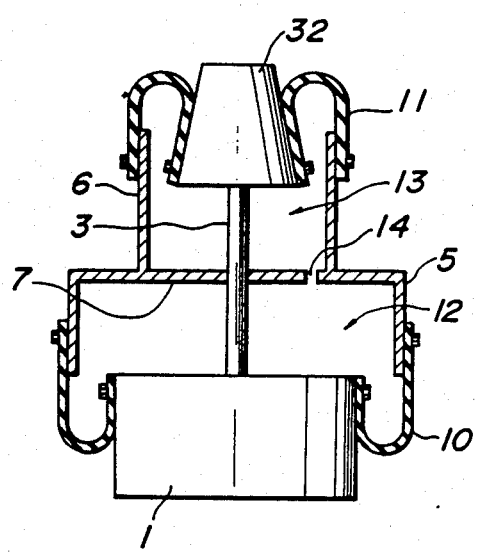
FIG_19
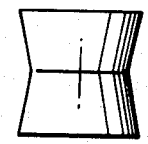
FIG_20a
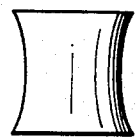
FIG_20b
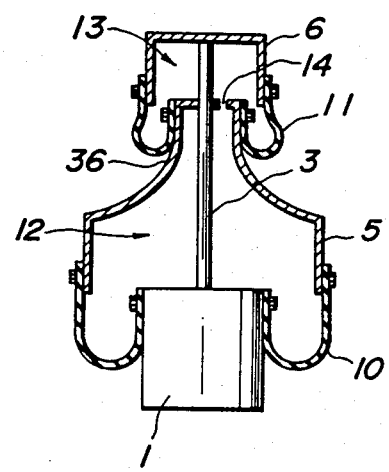
FIG_21

DIAPHRAGM TYPE AIR SPRINGS

This is a continuation of Ser. No. 877,709, filed on June 23, 1986, now abandoned, which is a continuation of Ser. No. 658,255, filed on Oct. 5, 1984, now abandoned.

BACKGROUND OF THE INVENTION

1. Field of the Invention

This invention relates to a diaphragm type air spring, and more particularly to an improvement of a diaphragm type differential air spring provided with two large and small air chambers.

2. Description of the Prior Art

Since an air spring of this type produces a large vibration damping force even at a small size, there have been proposed various structures for the air spring. These known air springs are roughly classified into a diaphragm type and a bellows type. They have advantages in that they produce the vibration damping force through the function thereof is the same as in metal springs and rubber springs, and that they are soft as compared with the metal and rubber springs and hence the spring height, load bearing capacity and spring constant can individually be set in the spring design. Therefore, these air springs are widely applied to various vibration systems such as industrial machines, automobiles, railway vehicles and the like for the purpose of vibration insulation and cushioning.

Moreover, it is known that the vibration damping force of the air spring is largely influenced by external factors such as speed, frequency and the like of vibration transmitted to the air spring as well as internal factors such as air flowing amount inside the air spring, air flow rate and the like.

In order to bring about an increase of the vibration damping force by increasing the air flowing amount, particularly exerted on the vibration damping force by the above described internal factors, therefore, it has hitherto been attempted to connect a flexible air spring to an auxiliary tank through an orifice to thereby permit the flow of air between them.

According to this prior art, however, the air flowing amount inside the air spring is determined only by the change of pressure inside the air spring, i.e. the difference in pressure between the air spring and the auxiliary tank. For example, when the enclosed internal pressure P of the air spring is increased to $P+\Delta P$ by the compression deformation of the air spring, air merely flows from the air spring into the auxiliary tank until the pressure increment $\Delta P$ spreads into the inside of the auxiliary tank not subjected to the deformation or still holding the internal pressure P in the compression deformation of the air spring so that the internal pressure of each of the air spring and the auxiliary tank becomes equal to $P+\Delta P_0$ (wherein $\Delta P_0$ is less than $\Delta P$). Therefore, such a combination of the air spring and the auxiliary tank cannot provide a large vibration damping force. Nevertheless, if it is intended to obtain a relatively large vibration damping force, the volume of the auxiliary tannk must be enlarged considerably, which create problems in the cost and installation space.

Further, it is confirmed from experiments that the limit of the present increment $\Delta P$ to the enclosed internal pressure P of the air spring and auxiliary tank is $\Delta P_{max} = 0.1 \sim 0.3P$. In case of the air spring provided with a small size auxiliary tank, therefore, it is actually impossible to obtain a large vibration damping force.

SUMMARY OF THE INVENTION

It is, therefore, an object of the invention to advantageously solve the aforementioned problems of the prior art and to provide a diaphragm type air spring of a differential system which can produce a large vibration damping force by increasing the air flowing amount inside the air spring.

According to the invention, there is the provision of a diaphragm type air spring, which comprises:

large and small piston members integrally connected to each other;

large and small outer shells coaxially arranged with said piston members and integrally connected to each other with a common partition, each of said large and small outer shells having a diameter larger than that of each of said respective large and small piston members;

a diaphragm airtightly connecting each of said large and small outer shells to each of said respective large and small piston members; and an orifice formed in said partition so as to communicate a small air chamber defined by said small piston member, small outer shell, diaphragm and partition with a large air chamber defined by said large piston member, large outer shell, diaphragm and partition, whereby a load of vibration system is born with said large piston member and said large outer shell integrally connected thereto.

In a preferred embodiment of the invention, the large piston member is connected to the small piston member with a piston rod axially sliding through a hole formed in the partition, and an O-ring is interposed between the hole of the partition and the piston rod, or at least one peripheral surface of the hole and the piston rod is subjected to an anti-friction coating. In another preferred embodiment of the invention, the orifice has an opening area $S_0$ and an axial length l satisfying the following relationship:

$$l/\sqrt{S_0} \leq 4$$

According to the other preferred embodiment of the invention, the peripheral length of at least one of the large and small piston members is gradually changed in the axial direction.

BRIEF DESCRIPTION OF THE DRAWING

The invention will be described with reference to the accompanying drawing, wherein:

FIG. 2 is a graph showing the relation between the piston moving speed and the vibration damping force in the air spring of FIG. 1;

FIG. 3 is a graph showing the relation between the piston moving speed and the vibration damping force with or without seal;

FIG. 4 is an enlarged sectional view illustrating the state of coating the piston rod and the hole of the partition with an anti-friction material;

FIG. 5 is a graph showing the relation between the contact area and the dynamic spring constant with or without teflon coating;

FIG. 6 is a graph showing the change of dynamic spring constant by a ratio of thickness of partition to diameter of rod;

FIG. 7 is a graph showing changes of vibration damping force and dynamic spring constant against the relation between opening area and axial length in the orifice;

FIG. 10 is an enlarged sectional view of the variable orifice;

FIGS. 11 and 12 are graphs showing changes of vibration damping force and dynamic spring constant when using the variable orifice of FIG. 10, respectively;

FIGS. 13a and 13b are plan views of another embodiments of the variable orifice, respectively;

FIG. 14 is a sectional view of a second embodiment of the diaphragm type air spring according to the invention;

FIG. 15 is a sectional view of a third embodiment of the diaphragm type air spring according to the invention;

FIG. 16 is a graph showing a load-deflection curve of the air spring according to the invention;

FIG. 17 is a sectional view of a fourth embodiment of the diaphragm type air spring according to the invention;

FIGS. 18a and 18b are sectional views illustrating the deformation state of the air spring of FIG. 17, respectively;

FIG. 19 is a sectional view of a fifth embodiment of the diaphragm type air spring according to the invention;

FIGS. 20a and 20b are side views of another embodiments of the piston member, respectively; and FIG. 21 is a sectional view of a sixth embodiment of the diaphragm type air spring according to the invention.

DETAILED DESCRIPTION OF THE INVENTION

Figure 1:
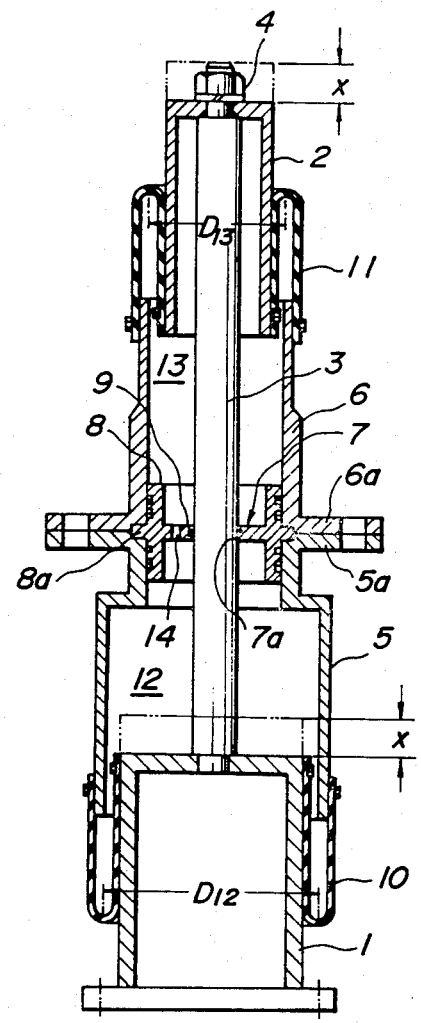
FIG. 1 is a sectional view of a first embodiment of the diaphragm type air spring according to the invention.

In the diaphragm type air spring according to the invention, as the large air chamber is subjected to compression deformation, for example, by the transmission of vibrations to the large piston member to thereby reduce the volume of this air chamber, the small piston member integrally connected to the large piston member moves by an amount equal to the stroke of the large piston member to increase the volume of the small air chamber, so that the internal pressure of the large air chamber with respect to the enclosed internal pressure P increases by $\Delta P_{12}$, while the internal pressure of the small air chamber decreases by $\Delta P_{13}$ and hence the pressure difference between both the air chambers is $\Delta P_{12} + \Delta P_{13}$. Therefore, air flows from the large air chamber into the small air chamber until the pressure difference disappears. That is, the air flowing amount in the air spring according to the invention is about two times that of the prior art, so that the air spring according to the invention produces a very large vibration damping force even at a small size.

Particularly, when an O-ring is interposed between the hole of the partition and the piston rod to airtightly seal the gap therebetween, the flowing of air passing through the gap is sufficiently prevented, while air passes through only the orifice having a given opening area, whereby the effective damping of vibrations can be attained. On the other hand, when at least one peripheral surface of the piston rod and the hole of the partition is subjected to an anti-friction coating, even if the gap between the hole and the piston rod is made narrower, not only the friction force between the partition and the piston rod can sufficiently be made small to reduce a so-called dynamic spring constant, but also the air flowing amount passing through the gap can considerably be decreased to produce the effective damping of vibrations through the orifice. Moreover, when the orifice satisfies the relationship of $l/\sqrt{S_0} \leq 4$, the flow rate of air through the orifice can advantageously be controlled to produce a satisfactorily large vibration damping force as well as a sufficiently small dynamic spring constant. If the opening area of the orifice is changed within a range satisfying the above relationship by stages or without stages and by manual or automation, optimum or desirable vibration damping force and dynamic spring constant can always be obtained.

Furthermore, when the peripheral length of at least one of the large and small piston members is gradually changed in the axial direction, the deformation form of the diaphragm can be changed in accordance with the stroke of the piston to properly change the load bearing capacity, whereby a variable air spring having optional properties can be obtained. In other words, when such an air spring is applied to vibration machines and the like, all vibrations transmitted to the air spring can sufficiently and effectively be damped because of the soft spring.

In FIG. 1 is schematically shown a first embodiment in section of the diaphragm type air spring according to the invention, wherein numeral 1 is a large piston member, numeral 2 a small piston member, and numeral 3 a piston rod connecting the large piston member 1 to the small piston member 2 in a coaxial relation. In this case, the piston rod 3 directly connects the piston members 1 and 2 to each other, in which one end of the rod 3 is fixed to the top surface of the large piston member 1 having a hollow structure by welding or the like and the other end thereof is secured to the top surface of the small piston member 2 having a hollow structure through a nut 4.

Further, numerals 5, 6 are cylindrical outer shells each arranged opposite to each of the large and small piston members 1, 2 and having a diameter larger than that of each of the respective large and small piston members 1, 2. These outer shells 5 and 6 are coaxially arranged with the piston members 1, 2 and integrally connected to each other at flanges 5a, 6a provided on the ends thereof at sides apart from the piston members by welding or by means of bolts and nuts (not shown). Further, these outer shells 5, 6 have a common partition 7 for airtightly dividing the insides of the shells into two chambers.

The partition 7 is composed of a partition body 8 having a substantially H-shape in section and fixed in place by clamping a flange 8a arranged on a middle of the partition body 8 in its longitudinal direction between the flanges 5a and 6a. Further, plural O-rings are interposed between the outer peripheral surface of the partition body 8 and the inner peripheral surface of each of the outer shells 5, 6, whereby airtightness is achieved between the partition body and the outer shell. On the other hand, the partition 7 has a hole 7a permitting the sliding of the rod 3 at its central part. The airtightness required between the hole 7a and the rod 3 is obtained, for example, by interposing an O-ring therebetween. Moreover, in order to effectively prevent abrasion between the rod 3 and the hole 7a resulted from the sliding movement of the rod 3, it is preferable to coat at least one of the rod 3 and the hole 7a with an anti-friction material such as Teflon (trade name, polytetrafluoroethylene), nylon, ceramic or the like.

In FIG. 1, numerals 10, 11 are diaphragms, one end of each of which being secured to the end portion of each of the piston members 1, 2 on the side of the middle of the rod and the other end being secured to the end portion of each of the outer shells 5, 6 on the side of the rod end. In the illustrated embodiment, each of the diaphragms 10, 11 is folded toward the side of the rod end to overlap the folded portion with each of the piston members 1, 2, and airtightly connects each of the piston members 1, 2 to each of the respective outer shells 5, 6. Thus, the piston members 1, 2, outer shells 5, 6 and diaphragms 10, 11 form large and small air chambers 12, 13 together with the common partition 7, respectively.

Moreover, the large and small outer shells 5 and 6, more particularly the large and small air chambers 12 and 13 communicate with each other through an orifice 14 formed in the partition 7 for producing a necessary damping action.

In the diaphragm type air spring of the above structure, the large and small air chambers 12 and 13 are closed after a given internal air pressure is supplied to each of the air chambers 12 and 13. Then, the large piston member 1 is connected to a machine side of a vibration machine, for example, an unspringing portion of an automobile, while at least one of the outer shells 5 and 6, particularly the flanges 5a and 6a in this embodiment are connected to an installation floor of the vibration machine, for example, a springing portion of the automobile, whereby a load of the machine is sufficiently born and also vibrations are satisfactorily damped.

In the air spring of FIG. 1, an effective diameter $D_{12}$ or an effective area $A_{12}$ of the large air chamber 12 defined by the large piston member 1, large outer shell 5 and diaphragm 10 is larger than an effective diameter $D_{13}$ or an effective area $A_{13}$ of the small air chamber 13 defined by the small piston member 1, small outer shell 6 and diaphragm 11, so that when an enclosed internal pressure in the large and small air chambers 12, 13 is P, a load W borne by the air spring is $W = P(A_{12} - A_{13})$ at a static state. Therefore, a necessary load can sufficiently be borne by properly selecting the value of the enclosed internal pressure P. On the other hand, when the large piston member 1 is subjected to a pushing force from the unspringing portion to displace upward by a distance x as shown by a phantom line in FIG. 1, the large air chamber 12 is deformed under compression by such a displacement to increase the internal pressure by $\Delta P_{12}$ so that the total internal pressure in the large air chamber is $P + \Delta P_{12}$, while the volume of the small air chamber 13 is increased so that the total internal pressure in the chamber 13 is $P - \Delta P_{13}$. Thus, the pressure difference between both the air chambers 12 and 13 is $\Delta P_{12} + \Delta P_{13}$, so that the flowing of air from the large air chamber 12 to the small air chamber 13 is held until the internal pressure in each of the air chambers 12 and 13 reaches a uniform pressure of $P + \Delta P_m$ (wherein $\Delta P_m$ is $-\Delta P_{13} < \Delta P_m < \Delta P_{12}$). As a result, the air flowing amount in the air spring becomes sufficiently large and effective damping of vibrations is produced. In the conventional air spring connected to the auxiliary tank through the orifice, however, even if the internal pressure in the air spring is increased to $\Delta P_{12}$ likewise the case of the above illustrated embodiment, the pressure difference between the air spring and the auxiliary tank is only $\Delta P_{12}$ because the volume of the auxiliary tank is always constant. Therefore, when the internal pressure in the conventional air spring finally reaches a stable pressure of $P + \Delta P_0$, this increment $\Delta P_0$ is fairly larger than the aforementioned $\Delta P_m$ and consequently the air flowing amount and vibration damping force become considerably small as compared with hose of the air spring according to the invention.

Moreover, when the displacing direction of the large piston member 1 is reversed to the case of the illustrated embodiment, the same vibration damping force as mentioned above is obtained by the reverse action of the air chambers 12 and 13.

FIG. 2 illustrates comparative results on the vibration damping force between the air springs of the invention and the prior art. Such a comparative test is carried out under conditions that the effective area $A_{12}$ and volume $V_{12}$ of the large air chamber 12 are 72 cm$^2$ and 850 cc, the effective area $A_{13}$ and volume $V_{13}$ of the small air chamber 13 are 28 cm$^2$ and 590 cc, the effective area and volume of the conventional diaphragm type air spring are 44 cm$^2$ (which is equal to $A_{12}-A_{13}$) and 850 cc (which is equal to $V_{12}$), the volume of the auxiliary tank is 2,550 cc, the enclosed internal pressure P is 6 kg/cm$^2$, the diameter of the orifice is 3 mm and the amplitude of vibration is ±20 mm. As apparent from FIG. 2, the vibration damping force of the air spring according to the invention shown by a solid line is fairly higher than that of the conventional air spring shown by a dot-dash line irrespective of the piston moving speed, and also the difference in the vibration damping force between the invention and the prior art becomes larger as the piston moving speed increases.

In the air spring according to the invention, the flow of air is completely performed through the orifice 14 having a given opening area due to the presence of the O-ring 9 interposed between the piston rod 3 and the hole 7a of the partition 7, i.e. the flowing of air passing through the gap between the rod 3 and the hole 7a is effectively prevented by the O-ring interposed therebetween. Thus, there is no damage to the aforementioned vibration damping performance of the air spring, which is also understood from FIG. 3. As shown by a solid line in FIG. 3, the vibration damping force of the air spring to the piston moving speed is considerably higher when compared with the case of freely passing the piston rod 3 through the hole 7a (shown by a broken line in FIG. 3, in which a relatively large amount of air passes through the gap between the rod and the hole).

FIG. 4 illustrates an enlarged section of a main part in a modified embodiment of FIG. 1 for reducing the dynamic spring constant while maintaining substantially the same vibration damping performance as in FIG. 1, wherein anti-friction coating layers 15, 16 each composed of a substance having a low friction coefficient such as nylon, teflon, oil-containing rubber or the like are arranged on the hole 7a of the partition 7 and the outer peripheral surface 3a of the piston rod 3, respectively.

That is, these anti-friction coating layers 15, 16 considerably reduce the friction force between the rod 3 and the hole 7a, so that the gap between the rod and the hole can be made narrower to extremely reduce the amount of air passing through the gap. Therefore, the air spring of FIG. 4 produces not only the sufficiently large vibration damping force through the effective action of the orifice 14 but also the considerable reduction of dynamic spring constant through the presence of the anti-friction coating layers 15, 16 arranged on the rod 3 and the hole 7a.

In FIG. 5 is shown a state that the dynamic spring constant is reduced by the anti-friction coating layers 15, 16 when the contact area between the rod 3 and the hole 7a is changed at a gap of about 0.1~0.3 mm. As seen from FIG. 5, in case of using no anti-friction coating layer as shown by a broken line, the dynamic spring constant increases at a relatively high rate with the increase of the contact area, while in case of using the anti-friction coating layers 15, 16 each made of teflon as shown by a solid line, the increasing rate of the dynamic spring constant largely reduces, which makes possible to effectively damp high frequency and small amplitude vibrations. Moreover, even when the anti-friction coating layers 15, 16 are arranged on the rod and the hole, the dynamic spring constant gradually increases as the contact area between the rod 3 and the hole 7a increases. In this connection, FIG. 6 shows results when the change of dynamic spring constant is actually measured by changing the contact area based on the change of the partition thickness t as a parameter at a constant diameter of the rod d. It can be seen from FIG. 6 that the more effective damping against high frequency and small amplitude vibrations can be obtained by selecting the partition thickness t within a range of t/d<1 which is relatively gentle in the increasing gradient of dynamic spring constant.

As mentioned above, in the air spring according to the invention, the considerable increase of vibration damping force is produced by increasing the air flow amount. Further, the vibration damping force is also influenced by the air flow rate, i.e. the opening area ($S_0$) and axial length (l) of the orifice 14 in addition to the air flowing amount. On the other hand, the air flow rate largely exerts on the spring constant of the air spring or a so-called dynamic spring constant, so that the opening area $S_0$ and axial length l of the orifice 14 satisfy the relationship of $1/\sqrt{S_0} \leq 4$.

The air flowing amount passing through the orifice 14 is theoretically represented by the following equation:

$$Q = \frac{\pi d^2}{4} \sqrt{\frac{2g\gamma \cdot \Delta P}{(\lambda l/d) + \Sigma \zeta + 1}}$$

wherein $\Delta P$ is a pressure difference, d is a diameter of the orifice, $\gamma$ is a coefficient, $\lambda$ is a friction coefficient of the hole, and $\zeta$ is a loss factor other than friction. As apparent from the above equation, the air flowing amount and hence the vibration damping force lowers as l/d or $1/\sqrt{S_0}$ becomes large, so that it is advantageous to restrict $1/\sqrt{S_0}$ to not more than the specified value in order to provide a large vibration damping force. Moreover, it is experientially confirmed that when $1/\sqrt{0}$ exceeds 4, the vibration damping force rapidly reduces as shown by a solid line in FIG. 7.

FIG. 7 illustrates results when the air spring according to the invention is tested at a frequency of 3 Hz under the same conditions as described on FIG. 2. Even if the value of the frequency is changed, the obtained curves show the same tendency as in FIG. 7.

As apparent from a broken line of FIG. 7, $1/\sqrt{S_0}$ largely exerts on the dynamic spring constant. Since the dynamic spring constant particularly makes a standard for the vibration damping performance against high frequency and small amplitude vibrations, if the dynamic spring constant is large, vibrations transmitted to the air spring are substantially output without being damped, resulting in the damage of ride comfortability in the automobile provided with the air spring. According to the invention, therefore, the value of $1/\sqrt{S_0}$ is limited to not more than 4 under the harmony with the aforementioned vibration damping performance, whereby the rapid rise of the dynamic spring constant is prevented.

In the air spring of FIG. 1, the piston rod 3 slidably moves to the partition 7, so that the air flow is considered to produce through a gap between the rod and the hole of the partition. In order to significantly achieve the above specified relationship between the diameter (or opening area) and the axial length of the orifice, therefore, it is a matter of course that the area S of the gap between the rod and the hole should be sufficiently smaller than the opening area $S_0$ of the orifice 14. On the other hand, if the gap between the rod and the hole is too small, the friction force therebetween becomes larger to reduce the vibration damping performance. From these facts, it is preferable that the gap area S is determined by taking account of the above, while at least one of the rod and the hole is coated with the low friction material as previously mentioned.

Figure 8:
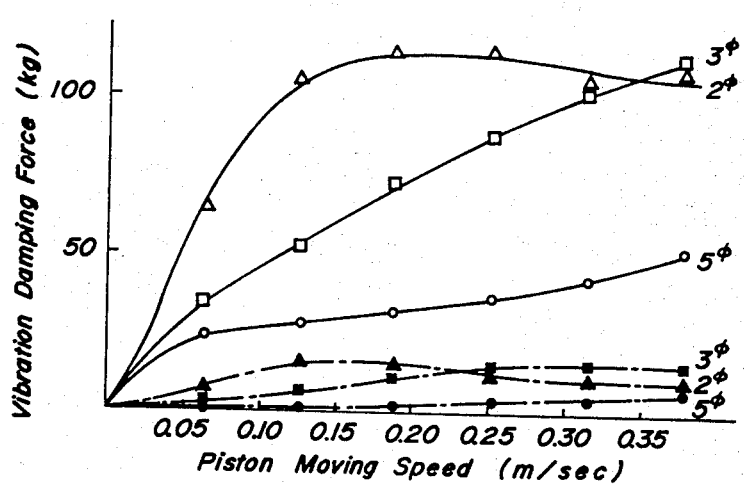
FIGS. 8 and 9 are graphs showing changes of vibration damping force and dynamic spring constant when changing the diameter of the orifice, respectively.

In FIG. 8 is shown comparative results between the air springs of the invention and the prior art when the vibration damping force is measured under the same conditions as mentioned on FIG. 2 by changing the size (or diameter) of the orifice so as to increase the air flowing amount as previously mentioned.

In FIG. 8, solid lines show vibration damping curves in the air spring according to the invention, and dot dash lines show vibration damping curves in the air spring off the prior art. As apparent from FIG. 8, the vibration damping force of the air spring according to the invention is considerably larger than that of the prior art in all cases that the orifice diameter $\phi$ is 2 mm, 3 mm and 5 mm. Particularly, when the orifice diameter $\phi$ is 2 mm, the air spring according to the invention develops a very large vibration damping force at a region of slow piston moving speed.

Figure 9:
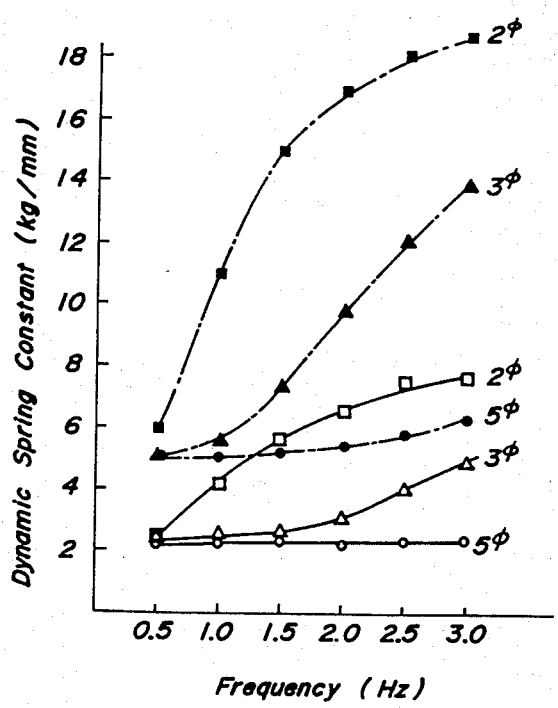

In FIG. 9 is shown a change of dynamic spring constant under the same conditions as mentioned on FIG. 2 except that the frequency of the vibration is varied. As apparent from FIG. 9, the dynamic spring constant of the air spring according to the invention as shown by solid lines is less than a half that of the prior art as shown by dot dash lines in all cases that the orifice diameter $\phi$ is 2 mm, 3 mm and 5 mm. Therefore, the air springs according to the invention can produce a satisfactory damping force against high frequency and small amplitude vibrations.

As mentioned above, the air spring according to the invention not only can produce a large vibration damping force by increasing the air flowing amount but also can always develop an effective vibration damping by controlling the air flow rate to prevent the reduction of vibration damping force and the rise of dynamic spring force.

Moreover, according to the invention, optimum or required vibration damping force and dynamic air spring can always be obtained by changing the opening area of the orifice 14 under such a condition that the opening area $S_0$ and axial length l of the orifice 14 satisfies the aforementioned relationship.

In FIG. 10 is sectionally shown an embodiment of the orifice 14 having a variable opening area for achieving the above purpose.

In this embodiment, a through-hole 18 having an opening area equal to the maximum opening area of the orifice 14 is formed in the partition 7, while an annular plate 17 is rotatably placed on the partition 7 and plural control holes 20 having different opening areas are formed in the annular plate 17 at its given circumferential position corresponding to the through-hole 18.

The rotary motion of the annular plate 17 can manually or automatically be carried out from the outside of the air spring through any suitable means. For instance, when the air spring is applied to the automobile, the automatic rotation of the annular plate 17 can be conducted by directly or indirectly feeding one or more signals output from steering angle, running speed, revolutions of engine, speed and acceleration of relative vibration between springing and unspringing portions and the like.

Thus, the flowing of air between the large and small air chambers 12 and 13, that is, the vibration damping is mainly performed under the action of the control hole 20 located on the through-hole 18 when the annular plate 17 is properly rotated, or under the action of the through-hole 18 when the opening of the orifice 14 is maximum. As a result, the vibration damping force and the dynamic spring constant can be determined to required values by selecting the control hole 20 based on the rotary motion of the annular plate 17.

In FIG. 11 is shown a change of vibration damping force in the air spring provided with the orifice having the aforementioned effective and variable opening area when varying such an opening area. As seen from FIG. 11, in case of the orifice having a constant opening area (3ϕ, 4ϕ or 5ϕ), the vibration damping force is largely influenced by the degree of piston moving speed as shown by dotted lines, so that it is necessary to select an air spring having a desired orifice diameter in accordance with the degree of piston moving speed. On the contrary, when the effective opening area of the orifice 14 is varied properly, the necessary vibration damping force can be obtained without being much influenced by the piston moving speed as shown by a solid line, so that various vibrations can effectively be damped by the single air spring.

In FIG. 12 is shown a change of dynamic spring constant when varying the effective opening area of the orifice in the air spring. As apparent from FIG. 12, even when the opening area of the orifice is varied in the same manner as in FIG. 11 to decrease the fluctuation of the vibration damping force against the piston moving speed, the dynamic spring constant can be reduced sufficiently.

Therefore, when the effective opening area of the orifice 14 is properly selected in accordance with the use state under the condition that the opening area $S_0$ and axial length l of the orifice satisfy the given relationship, a sufficiently large vibration damping force and a sufficiently small dynamic spring constant can be produced in addition to the effective prevention prevention against the reduction of vibration damping force and rise of dynamic spring constant.

In the orifice 14 of FIG. 10, the opening area is varied by properly selecting the control hole 20 of the annular plate 17 as mentioned above, so that the state of varying the opening area becomes stepwise and at the same time a temporary shut-off state of air flowing is caused, which may be an obstacle to the vibration damping. In order to avoid such an obstacle, as shown in FIGS. 13a and 13b, a single shielding plate 22 is placed on the partition 7 at a position corresponding to the through-hole 18 instead of the annular plate 17 to form the orifice 14. In this case, the opening degree of the through-hole 18 is changed by the restricted reciprocating or rotating motion of the shielding plate 22 (the reciprocating motion in the illustrated embodiment), whereby the opening area of the orifice 14 can continuously be varied without shutting off the air flowing.

FIG. 14 sectionally illustrates a second embodiment of the air spring according to the invention, wherein the piston members 1 and 2 are connected to each other at the outsides of the air chambers 12 and 13 through brackets 24, 26 secured to the piston members 1, 2 and the piston rod 3 connecting the brackets 24, 26 to each other. This embodiment can eliminate the problems produced by inserting the piston rod 3 into the hole 7a of the partition 7, such as air leakage, friction force and the like.

FIG. 15 sectionally illustrates a third embodiment of the air spring according to the invention, wherein the outer shells 5 and 6 and the partition 7 are formed by one-piece molding process and the folding directions of the diaphragms 10 and 11 are opposite to each other. Since large and small piston members 1, 2 in such an air spring have a uniform peripheral length over their whole length, the load-deflection curve of the air spring is always substantially straight as shown by a solid line in FIG. 16 and the spring characteristic thereof is unchanged.

FIG. 17 sectionally illustrate a modified embodiment of FIG. 15, wherein a large piston member 30 and a small piston member 32 are coaxially connected to each other with the piston rod 3 passing through the hole of the partition 7 and they have such a frustoconical form that the diameter of the piston member is gradually reduced from the end fixed to the piston rod toward the free end, respectively.

In the air spring of FIG. 17, when vibrations are applied in the compression direction of the large air chamber 12 as shown by an arrow A, the vibration damping action is performed by the movement of the piston members likewise the case of FIG. 1. Since the piston members 30, 32 have the properly selected frustoconical form, however, a ratio in effective diameter or effective pressure-receiving area of the large air chamber 12 to the small air chamber 13 changes in accordance with the moving amounts of the piston members 30, 32 or the amount of compression deformation as shown in FIGS. 18a and 18b showing the stages of compression deformation. As apparent from FIGS. 18a and 18b, the ratio of effective diameter of large air chamber 12 to effective diameter of small air chamber 13 becomes small as the amount of compression deformation increases. Thus, the load bearing capacity of the air spring changes in compliance with the degree of load as is expected.

The broken line of FIG. 16 shows a load-deflection curve of the air spring shown in FIG. 17. As apparent from this curve, the air spring as shown in FIG. 17 has a very soft spring characteristic under a small load and is a variable spring under a large load because the rigidity is not so raised.

FIG. 19 sectionally illustrates another modified embodiment of FIG. 15, wherein only the small piston member 32 has a specified frustoconical form in accordance with the expected load-deflection curve. Such an air spring has also the load bearing capacity in compliance with the form of the small piston member 32.

Moreover, in order to produce a desirable load bearing capacity, there may be taken that only the large piston member 1 has a frustoconical form as shown in FIG. 17, that in at least one of the piston members 30 and 32, the tapered direction is opposite to the case of FIG. 17 or the tapered angle is changed or the peripheral wall of the piston member is curved, and that at least one of the piston members 1 and 2 has a narrow part at the middle portion as shown in FIGS. 20a and 20b.

FIG. 21 sectionally illustrates a further embodiment of the air spring according to the invention, wherein the large outer shell 5 is separated from the small outer shell 6, and the upper portion of the large outer shell 5 is curved upward and integrally connected to a small piston member 36. Further, the top wall of the small outer shell 6 arranged opposite to the small piston member 36 is connected to the large piston member 1 with the piston rod 3 passing through a hole of the top wall of the small piston member 36, the latter top wall also acting a the partition and being provided with the orifice 14.

The air spring of FIG. 21 has also the load bearing capacity in accordance with the form of the small piston member 36 likewise the case of the aforementioned embodiments.

As mentioned above, according to the invention, the pressure difference between the large and small air chambers can be made about two times that of the prior art in the transmission of vibrations, so that the air flowing amount in the air chamber is sufficiently large and the effective vibration damping is produced. Furthermore, when the ratio of axial length to opening area in the orifice satisfies $l/\sqrt{S_0}=4$, the reduction of vibration damping force and the rise of dynamic spring constant can effectively be prevented, whereby various vibrations are always and effectively damped. Particularly, when the opening area of the orifice is variable within the range of $l/\sqrt{S_0} \leq 4$, the optimum or necessary large vibration damping force can always be obtained irrespective of the pistoin moving speed and also the dynamic spring constant can be decreased sufficiently.

Moreover, when O-ring is interposed between the piston rod and the hole of the partition passing the rod, the air flow through such a hole is satisfactorily restricted, while when at least one of the piston rod and the hole of the partition is subjected to an anti-friction coating, the dynamic spring constant is effectively decreased. In addition, when at least one of the large and small piston members has such a form that the peripheral length of the piston member is gradually changed in the axial direction, the load bearing capacity of the air spring can be changed to form a soft and variable spring sufficiently damping vibrations over a wide frequency range.

What is claimed is:

1. A diaphragm type air spring, comprising:
    large and small piston members integrally connected to each other by a piston rod so as to bear a load of a vibration system at a side of said large piston member;
    large and small outer shells coaxially arranged with said piston members and integrally connected to each other with a common partition, each of said large and small outer shells having a diameter larger than that of each of said respective large and small piston members;
    first and second diaphragms airtightly connecting each of said large and small outer shells to each of said respective large and small piston members and secured at one end to an outward end portion of each of said large and small outer shells, between which said first and second diaphragms support a springing portion of said vibration system by at least one of said outer shells at its outer periphery; and
    an orifice formed in at least a portion of said partition excluding a regiin from a through-hole of said partition and said piston rod so as to establish fluid communication between a small air chamber defined by said small piston member, said small outer shell, said second diaphragm and said partition and, a large air chamber defined by said large piston member, said large outer shell, said first diaphragm and said partition, and said orifice having an opening area So and an axial length l satisfying: $l/\sqrt{S_o} \leq 4$.

2. A diaphragm type air spring according to claim 1, wherein an O-ring is interposed between said piston rod and a hole formed in said partition for passing said piston rod.

3. A diaphragm type air spring according to claim 1, wherein at least one peripheral surface of said piston rod and a hole formed in said partition for passing said piston rod is subjected to an anti-friction coating.

4. A diaphragm type air spring according to claim 3, wherein said anti-friction coating is composed of a material having a low friction coefficient.

5. A diaphragm type air spring according to claim 1, wherein the diameter of at least one of said large and small piston members is gradually changed in the axial direction.

* * * * *